United States Patent [19]
Metzler, Jr.

[11] Patent Number: 6,010,273
[45] Date of Patent: Jan. 4, 2000

[54] SUSPENSION SYSTEM FOR A SEISMIC CABLE ARRAY

[75] Inventor: Allan R. Metzler, Jr., Independence, Ohio

[73] Assignee: PMI Industries, Inc., Cleveland, Ohio

[21] Appl. No.: 09/000,741

[22] Filed: Dec. 30, 1997

[51] Int. Cl.[7] .............................. B63G 7/04; F16G 11/04
[52] U.S. Cl. .................. 403/314; 403/312; 403/300; 403/291; 114/249
[58] Field of Search .................... 114/244, 243, 114/249, 251, 253; 367/17, 143, 15; 403/24, 291, 300, 301, 302, 312, 313, 314; 174/71 R, 72 R, 74 R, 79

[56] References Cited

U.S. PATENT DOCUMENTS

| | | |
|---|---|---|
| 2,722,393 | 11/1955 | Peterson . |
| 3,007,243 | 11/1961 | Peterson . |
| 3,723,636 | 3/1973 | Eucker .................................. 174/71 R |
| 3,749,816 | 7/1973 | Shaw . |
| 3,775,811 | 12/1973 | Smrekar et al. . |
| 3,829,937 | 8/1974 | Metzler . |
| 3,858,992 | 1/1975 | Eucker . |
| 3,921,257 | 11/1975 | Appleby et al. ...................... 174/71 R |
| 4,684,457 | 4/1971 | Appleby . |

OTHER PUBLICATIONS

Dyna–Hanger Mid–Span Cable Attachment PMI Industries, Inc, Apr. 1995.
Dyna–Hanger™ Mid–Span Cable Attachment (PMI Industries, Inc.) Apr., 1995.

*Primary Examiner*—Anthony Knight
*Attorney, Agent, or Firm*—Fay, Sharpe, Fagan, Minnich & McKee, LLP

[57] ABSTRACT

A suspension system (10) for mid-span connection of a paravane (P) or other article to a cable (C1) of a towed cable array (A) includes first and second hanger assemblies (20a, 20b) connected to the cable (C1) in an axially spaced relationship. In particular, the hanger assemblies (20a,20b) are connected respectively to first and second bulbous cable regions. The bulbous cable regions are formed on the cable using inner insert elements (40), a first set of preformed helical rods (22), outer insert elements (42) positioned over the first set of helical rods (22) in the region of the inner insert elements (40), and an outer set of preformed helical rods (24). Each hanger assembly (20a,20b) includes a housing (30a,30b) and a rotatable collar (52a,52b) connected to the housing. An attachment member (80a,80b) is pivotally connected to the collar and rotates therewith. The inner and outer insert elements (40,42) of each bulbous region optionally include aligned apertures (144,146) that receive an alignment pin when properly positioned about a cable (C1).

9 Claims, 5 Drawing Sheets

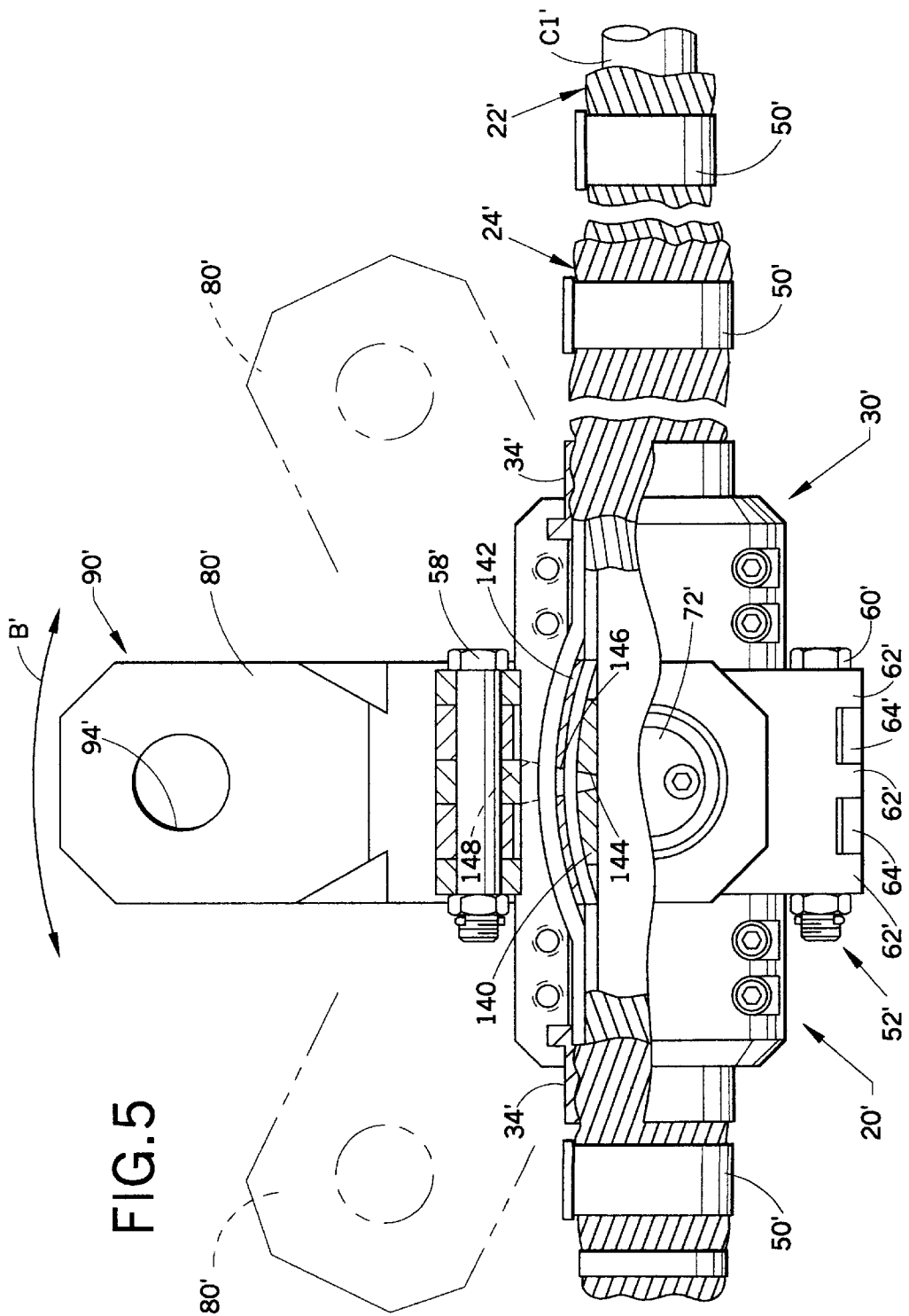

SUSPENSION SYSTEM FOR A SEISMIC CABLE ARRAY

BACKGROUND OF THE INVENTION

The present invention relates generally to a suspension system for cables, and more particularly to a system for suspending a paravane or other article from a "mid-span" portion of a cable of an oceanographic seismic cable array.

In oceanographic surveying and other similar operations, a cable array including numerous cables is towed behind a ship or other vessel. The array includes a plurality of laterally-spaced cables to which surveying and other sensing equipment is attached. The cables include fiber-optic or other data conductors, along with load bearing elements sufficient to protect the data conductors from the large loads encountered during towing operations.

In prior systems, to ensure the proper lateral spacing of the cables in the array which often extend for several kilometers, it has heretofore been common to utilize a winch cable, separate from the towed cable array, connected to a paravane or the like. In this prior arrangement, the paravane was also connected to a "tag-line" such as a chain or cable transversely spanning and connected to each of the cables in the towed array. The towed paravane exerted a transverse force, relative to the direction of travel of the towing vessel, on each cable in the array so that the cables were laterally separated from adjacent cables by the tag line.

While this prior arrangement was generally effective, it was also cumbersome to deploy and to retrieve, and obviously required the use of an additional towing or winch line. Often, excessive bending of the towed cable occurred. This excessive bending damaged the fiber-optic or other data carriers in the bent cable. Prior attempts to attach a paravane directly to one of the towed array cables have not been successful. Certain arrangements caused excessive cable bending, while others did not provide a sufficiently secure connection of the paravane to the cable so that the paravane attachment hardware slipped along the outer surface of the cable causing damage thereto. Other paravane attachment hardware exerted excessive radial compressive forces on the cable to which the paravane was attached, thereby damaging the data conductors of the cable.

Therefore, a need has been found for a new and improved suspension system for a seismic cable array for mid-span attachment of a paravane or other article to a cable of a towed cable array.

SUMMARY OF THE INVENTION

In accordance with a first aspect of the present invention, a suspension system for connecting an article to a cable includes first and second inner insert elements positioned at least substantially circumferentially around a cable in an axially spaced relationship. An inner set of elongated helically preformed elements tightly encircle the cable and the first and second inner insert elements. First and second outer insert elements are positioned at least substantially circumferentially around the first and second inner insert elements, respectively, and the inner set of elongated helically preformed elements. An outer set of elongated helically preformed elements tightly encircles the inner set of helically preformed elements and the first and second outer insert elements such that the first inner and outer insert elements define a first mid-span bulbous cable region, and such that the second inner and outer insert elements define a second mid-span bulbous cable region. First and second article hanger assemblies are respectively connected to the first and second bulbous cable regions and each includes an article attachment member for mid-span attachment of an article to the cable.

In accordance with another aspect of the present invention, a system for suspending a paravane from a cable of a towed cable array includes first and second hanger assemblies for connection respectively to first and second axially spaced mid-span bulbous regions of a cable of a towed cable array. Each of the hanger assemblies includes a housing surrounding the respective first and second bulbous regions of the cable, a collar rotatably secured to the housing, and a paravane attachment member connected to the collar. Each of the first and second bulbous cable regions are formed on the cable by a first insert element positioned at least partially circumferentially around the cable, a first set of elongated preformed helical rods encircling the first insert element and the cable, a second insert element position at least partially circumferentially around the first set of helical rods and the first insert element, and a second set of elongated preformed helical rods encircling the second insert element and at least a portion of the first set of elongated preformed helical rods.

In accordance with still another aspect of the present invention, a method of connecting an article to a mid-span region of a cable includes positioning first and second inner inserts at least partially circumferentially around a cable in an axially spaced relationship and encircling the first and second inner inserts with helically preformed rod elements. First and second outer inserts are positioned at least partially circumferentially around the helically preformed rod elements in the axial region of the first and second inner inserts, respectively, and are encircled with elongated helically preformed elements to form first and second bulbous mid-span cable regions, respectively. First and second hanger assemblies are attached to the first and second bulbous cable regions, and the article is attached to both of the first and second hanger assemblies.

In accordance with a yet further aspect of the present invention, a suspension apparatus for connecting an article to a mid-span region of a towed cable includes an inner insert element positioned at least substantially around a mid-span region of the cable. An inner set of elongated helically preformed elements tightly encircles the mid-span region of the cable and the inner insert element. Similarly, an outer insert element is positioned at least substantially circumferentially around the inner insert element and the inner set of helically preformed elements. An outer set of elongated helically preformed elements tightly encircles the inner set of helically preformed elements such that the inner and outer insert elements together define a mid-span bulbous cable region. An article hanger assembly is connected to the mid-span bulbous cable region and includes an attachment member for mid-span attachment of an article to the cable.

One advantage of the present invention is the provision of a suspension system that provides for secure and effective mid-span connection of an article to a cable of a towed cable array.

Another advantage of the present invention is the provision of a suspension system for mid-span connection of a paravane to a cable that does not damage the cable.

Still another advantage of the invention is that it allows a paravane or the like to be quickly disconnected from a cable.

Yet another advantage of the present invention is that it is easily installed onto a cable with the proper alignment of components.

A further advantage of the present invention is that axial slippage of the paravane or other suspended device is minimized or eliminated under even severe axially loading.

A still further advantage of the present invention is that it prevents excessive bending of the cable to which the paravane or other device is attached.

Other benefits and advantages of the invention will become apparent to those skilled in the art upon reading and understanding the following detailed description of the preferred embodiment.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

FIG. 5 is a side view, partially in cross-section and partially in elevation, of a mid-span hanger assembly in accordance with an alternative embodiment of the present invention.

DETAILED DESCRIPTION OF THE PREFERRED EMBODIMENTS

Figure 1:
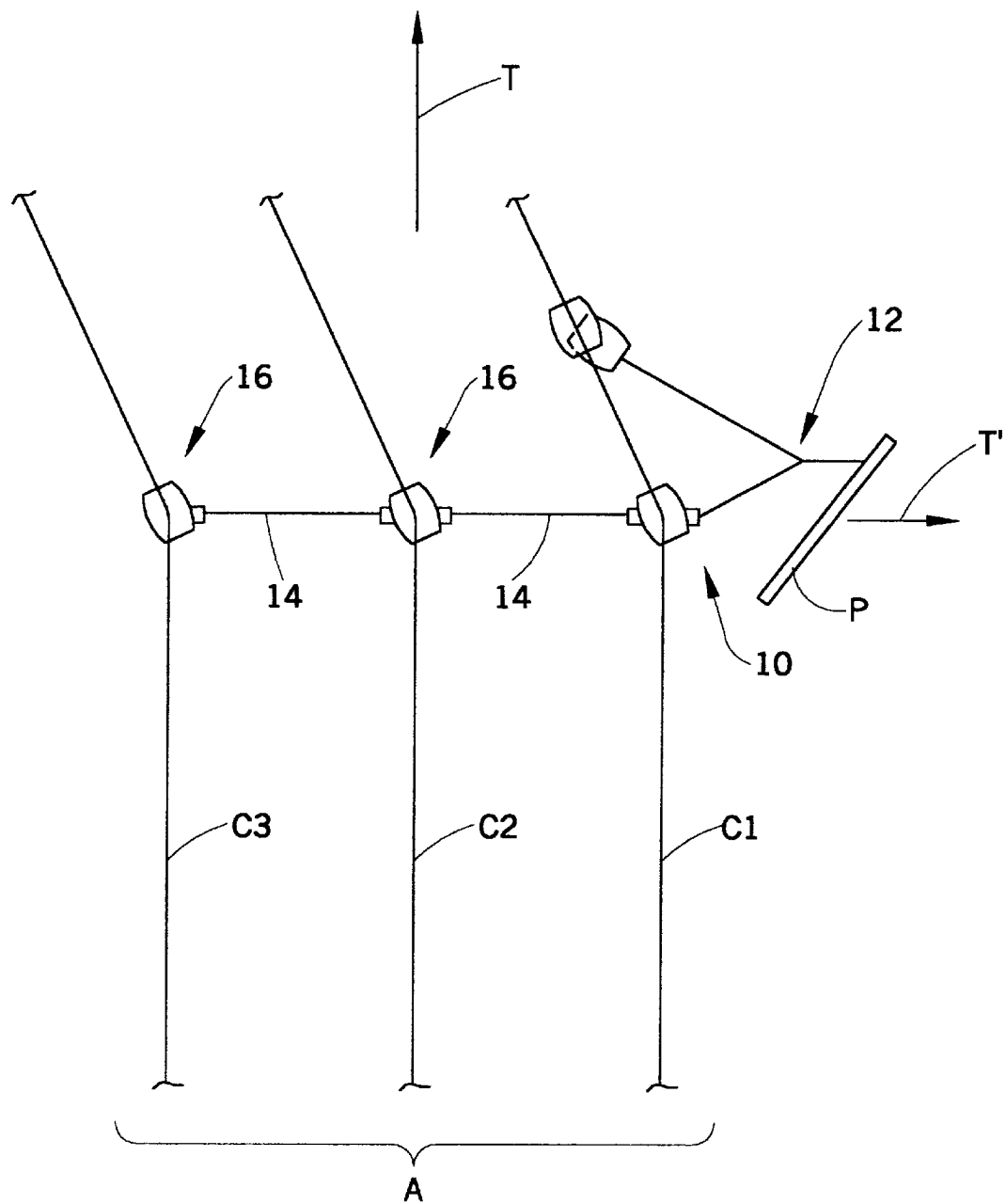
FIG. 1 is a diagrammatic illustration of a towed cable array utilizing suspension apparatus in accordance with the present invention.

In oceanographic surveying and the like, a ship or other marine vessel tows an array A of "lead-in" cables C1,C2,C3, as may be seen with reference to FIG. 1, in a towing direction T. A paravane, pullovane, or like article is suspended from the outermost "lead-in" cable C1 using a double attachment point suspension system 10 in accordance with the present invention. The cables C1,C2,C3 are interconnected using tag lines 14 which connect to the cables C1,C2,C3 using single attachment point suspension apparatus 16 in accordance with the present invention. Between the suspension system 10 and the paravane P, a bridle 12, made from cables, chains, or the like, is used to interconnect the paravane P to the suspension system 10. When the array A is towed in the towing direction T, the paravane P exerts a force on the lead-in cable C1 and the tag lines 14 in a transverse direction T' relative to the towing direction T. This causes the remaining cables C2,C3 to be towed in a parallel, laterally spaced relationship to each other as shown in FIG. 1 for effective oceanographic sensing operations.

Figure 2:
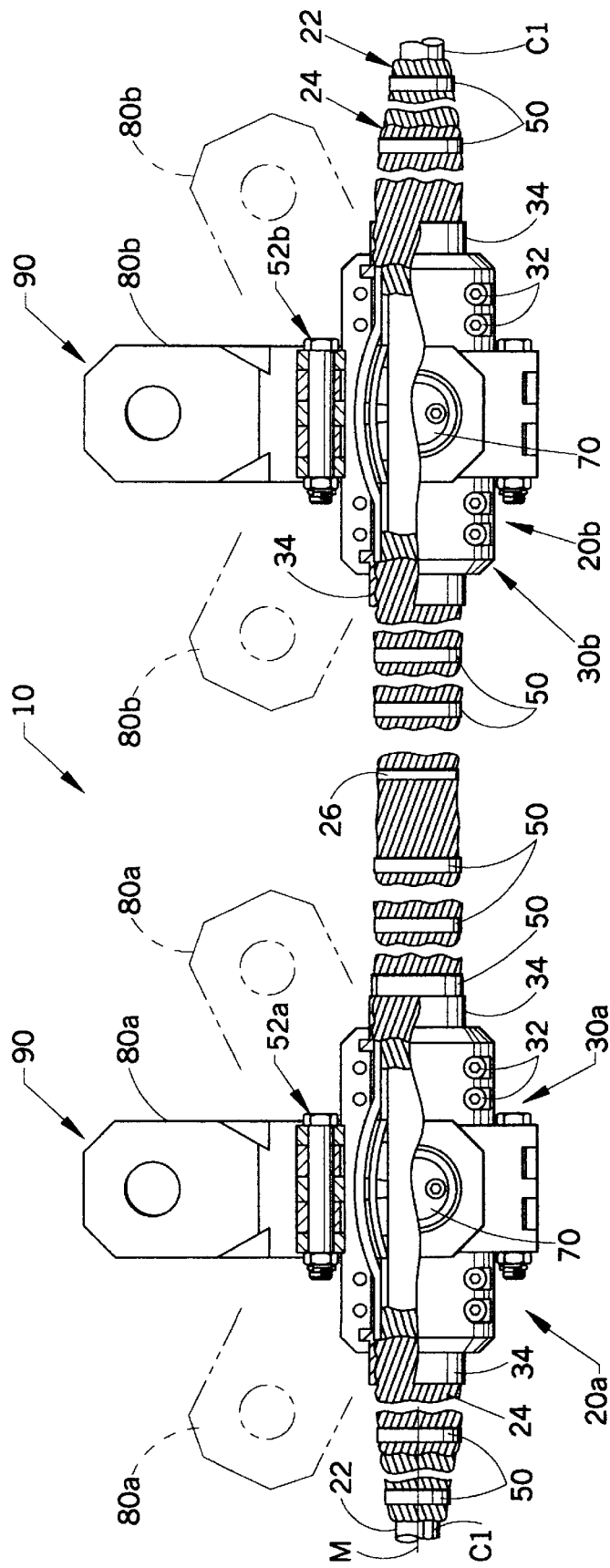
FIG. 2 is a side view, partially in cross-section and partially in elevation, of a double attachment point suspension system in accordance with the present invention, including first and second mid-span attachment assemblies.

Referring now particularly to FIG. 2, the double attachment point suspension system 10 comprises first and second hanger or attachment assemblies 20a,20b connected to the lead-in cable C1. The hanger assemblies 20a,20b are preferably similar in all respects, and like components thereof will be described herein with like reference numerals. The suspension system 10 also comprises a first or inner set of helically preformed rods 22 and a second or outer set of helically preformed rods 24 positioned over the rods 22. The rods 22 are wrapped in a tightly encircling relationship about the cable C1 and extend along a relatively long length thereof, e.g., approximately 300 inches. Likewise, the rods 24 are wrapped in a tightly encircling relationship about the rods 22, but are preferably slightly shorter, e.g., approximately 244 inches, to facilitate gentle bending of the cable C1.

Each set of helical rods 22,24 preferably includes a mid-point indicator mark 26, such as a black stripe or the like, to facilitate the connection of the rods 22,24 to the cable C1 in a proper aligned relationship to each other, i.e., the mark 26 on each set of rods 22,24 is preferably aligned along the cable axis M with the mark 26 on the other set of rods 22,24. The helical rods 22,24, are generally formed and used in accordance with U.S. Pat. No. 3,723,636, the disclosure of which is hereby expressly incorporated by reference herein. The inner and outer rod sets 22,24 together define a protective sheath about the cable over their length, which protects the cable from excessive radial compressive forces, and prevents excessive bending or pinching of the cable C1.

Figure 3:
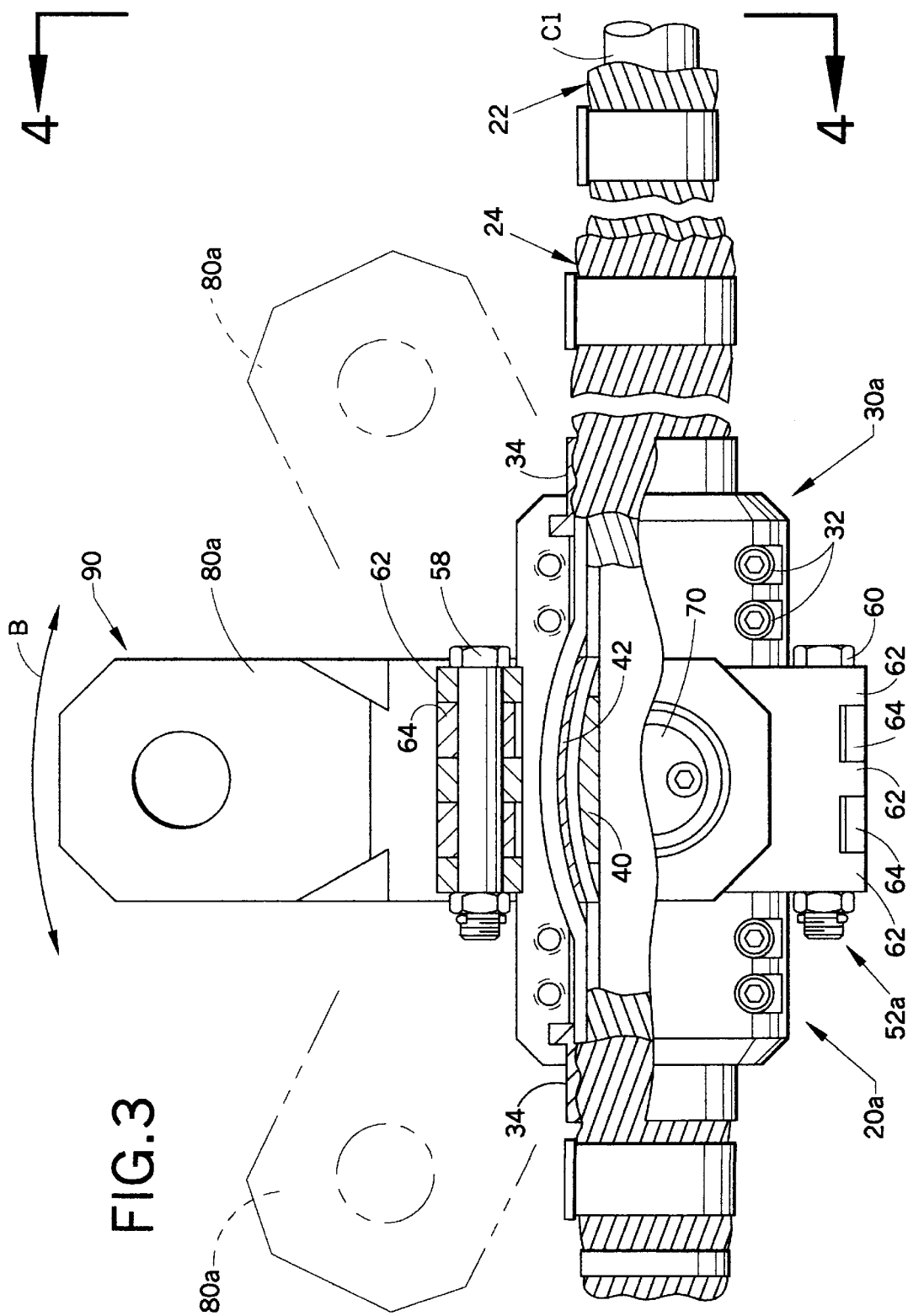
FIG. 3 is an enlarged view, partially in cross-section and partially in elevation, of a mid-span attachment assembly of the system shown in FIG. 2.

Each hanger assembly 20a,20b respectively includes a housing 30a,30b which is preferably split for ease of attachment about the outer helical rod set 24. The halves of the split housing 30a,30b are secured together with screws 32 or other suitable fasteners. With reference now also to FIG. 3, the attachment of the housing 30a to the cable C1 is shown. Those skilled in the art will recognize the housing 30b is attached in the same manner and the housing 30a. It can be seen that a first bulbous or egg-shaped and generally annular sleeve or insert 40 is positioned about the cable C1, radially between the cable and the rods 22. Likewise, a second bulbous or egg-shaped and generally annular sleeve or insert 42 is positioned radially between the inner rod set 22 and the outer rod set 24, axially aligned with the first insert 40. Each insert 40,42 is preferably also split to facilitate its placement around the cable and inner rod set 22, respectively. As is also described in the aforementioned U.S. Pat. No. 3,723,636, the inserts 40,42 together define a bulbous mid-span region in the cable C1 to which the housings 30a,30b are readily secured. The use of two inserts 40,42, rather than one, helps to limit axial movement of the housings 30a,30b along the cable axis M, and also prevents slippage of the outer rod set 24 relative to the inner rod set 22. As shown herein, it has been found to be most effective in preventing slippage of the rod sets 22,24 relative to each other that the outer insert 42 have an axial length greater than that of the inner insert 40. Further, it is most preferred that the sections defining the insert 40 do not completely encircle the cable C1 and that the sections defining the insert C2 do not completely encircle the inner rod set 22. In this manner, radial compression forces from the housing 30a are certain to be transferred from the insert 42, to the rods 22, to the insert 40, and to the cable C1 is an even and well distributed manner, rather than one of these elements bearing the entire radial load. In this manner, the housings 30a,30b are effectively attached to the cable C1 and are not able to rotate or move axially relative thereto under towing conditions.

Polyurethane sleeves 34 are preferably positioned at the opposite axial ends of each housing 30a,30b to prevent damage to the outer rod set 24 by the housings 30a,30b when the rod set 24 bends.

With reference again primarily to FIG. 2, the suspension system includes a plurality of locking bands 50 positioned tightly around the outer rod set 24 and the exposed ends of the inner rod set. These bands help to maintain the rods in position, and those located axially between the hanger assemblies 30a,30b prevent "birdcaging" or bulging of the rods 24 during towing operations.

The hanger assemblies 20a,20b respectively include collars 52a,52b mounted for rotation relative to the housing 30a,30b about the cable axis M. Alternatively, the collars may be non-rotatable. Each collar 52a,52b is mounted within an outer circumferential groove formed in its respective housing 30a,30b to prevent any axial movement of the collar relative to its housing 30a,30b. Each collar 52a,52b is preferably provided by first and second collar halves 54,56 (FIG. 4) joined together by first and second bolts or other fasteners 58,60. Most preferably, the collar halves 54,56 of each hanger assembly 20a,20b respectively include interengaging projections 62,64 (FIG. 3) when positioned about the housings 30a,30b to provide a more secure attachment of the collar 52a,52b about its housing 30a,30b, respectively.

Figure 4:
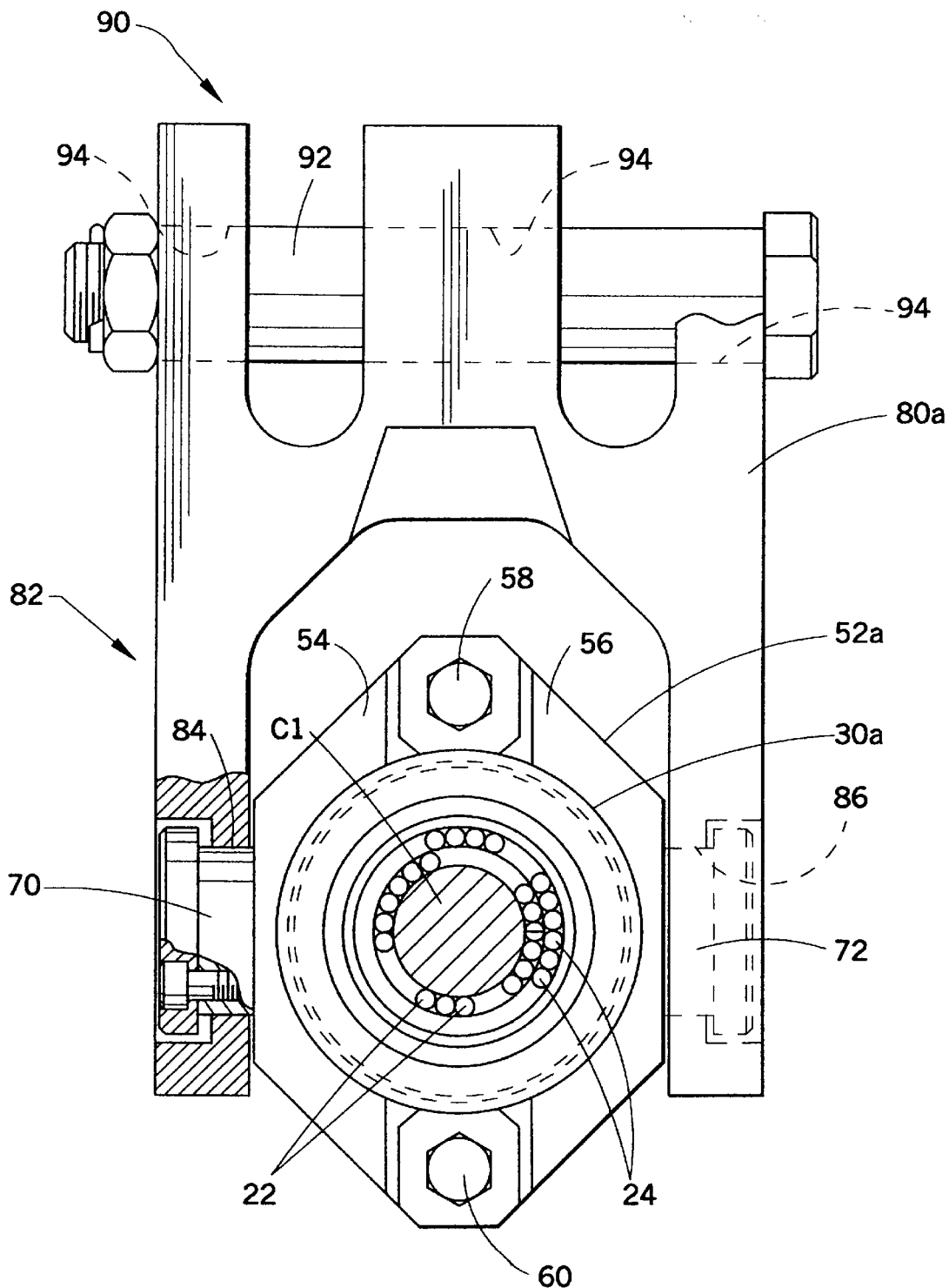
FIG. 4 is a view along line 4—4 of FIG. 3.

As is shown most clearly in FIG. 4, each collar 52a,52b includes a pair of trunnions 70,72 extending therefrom. Suspension arms 80a,80b are connected respectively to the collars 52a,52b by means of a yoke portion 82 including lateral bores 84,86 that mate respectively with the trunnions 70,72 of each collar 52a,52b. As is best seen in FIGS. 2 and 3, the trunnions 70,72 allow the suspension arms 80a,80b to pivot along an arc B and as is indicated in phantom.

Each suspension arm 80a,80b includes a clevis or other attachment point 90 to which a paravane or the like is attached by means of the bridle 12 or the equivalent. As shown herein, the attachment point 90 is preferably a double clevis arrangement including a cross-pin 92 engaged with apertures 94 formed through the double clevis attachment portion 90 of each suspension arm 80a,80b. A wide variety of other single or double attachment points may be used without departing from the scope and spirit of the present invention.

Thus, it can be seen from the foregoing that the suspension system 10 of the present invention includes first and second hanger assemblies 20a,20b connected to a cable C1 in an axially spaced relationship. First and second helical rod sets 22,24 prevent excessive cable bending and also act to secure the first and second inserts 40,42 in position to define bulbous attachment points for the hanger assemblies 20a, 20b, along with first and second inserts 40,42. The use of two hanger assemblies limits the load encountered by each and also distributes the load of the paravane P to different axial sections of the cable C1. The hanger assemblies pivot and rotate as described to accommodate twisting of the cable C1 or movement of the paravane without damage to the cable or the suspension system.

If the cable C1 includes an outer fabric fairing, it has been found preferable to remove any free strands or fairing "hair" beneath at least the inner inserts 40. Furthermore, any fairing "hair" located beneath the inner rod set 22, or between the inner and outer rod sets 22,24, should be pulled outward so that it extends between spaces in the rod sets 22,24 and is not trapped beneath the rod sets.

Although the invention has been described with reference to a double attachment point suspension system 10, those skilled in the art will recognize that the hanger assemblies 20a,20b in accordance with the foregoing are usable individually as single mid-span attachment point suspension apparatus 16 within the scope and intent of the subject invention.

FIG. 5 illustrates an alternative embodiment of a hanger assembly in accordance with the suspension system of the present invention. For ease of reference, like parts relative to the hanger assemblies 20a,20b are identified with like numerals including a primed (') suffix rather than an "a" or "b" suffix. New parts are referenced with new numerals.

The hanger assembly 20' is structured and used in place of the hanger assemblies 20a,20b in the same manner as described above. However, the hanger assembly 20' includes inner and outer inserts 140,142 respectively including apertures 144,146 formed therethrough to facilitate the proper axial alignment of the inserts relative to each other during the installation thereof on the cable C1'. During the installation of the inserts 140,142, a pin (not shown) is inserted into the aligned apertures 144,146 to prevent axial movement of the inserts 140,142 relative to each other. Upon the complete installation of the outer rod set, the pin is preferably, but not necessarily removed. Alternatively, the housing 30a,30b also includes an aperture 148 aligned with the apertures 144,146 when the housing is operatively positioned. In such case, insertion of the pin into the aligned apertures 144,146,148 prevents rotation of the housing relative to the inserts 140,142 as is sometimes desirable for transmitting very high torque loads between a cable and the housing. Otherwise, the hanger assembly 20' is similar in all respects to the hanger assemblies 20a,20b.

The invention has been described with reference to preferred embodiments. Obviously, modifications and alterations will occur to others upon reading and understanding the preceding specification. It is intended that the invention be construed as including all such modifications and alterations insofar as they come within the scope of the appended claims or the equivalents thereof.

Having thus described the preferred embodiments, the invention is now claimed to be:

1. A dual-hanger suspension system for connecting an article to a cable at both of two axially spaced-apart cable locations simultaneously, said suspension system comprising:

first and second inner insert elements positioned circumferentially around a cable in an axially spaced relationship at first and second spaced-apart cable locations, respectively;

an inner set of elongated helically preformed rods tightly encircling said cable and both said first and second axially spaced apart inner insert elements;

first and second outer insert elements positioned circumferentially around said first and second inner insert elements and said inner set of elongated helically preformed rods in an overlapping relationship at said first and second axially spaced-apart cable locations, respectively;

an outer set of elongated helically preformed rods tightly encircling said inner set of helically preformed rods and both said first and second axially spaced-apart outer insert elements such that said first inner and said first outer insert elements together define a first mid-span bulbous cable region at said first cable location, and such that said second inner and said second outer insert elements together define a second mid-span bulbous cable region at said second cable location, whereby said first and second mid-span bulbous cable regions are axially spaced-apart on said cable; and, first and second article hanger assemblies respectively connected to said first and second bulbous cable regions at said first and second axially spaced-apart cable locations, each of said first and second article hanger assemblies including an article attachment member for mid-span attachment of an article to said cable.

2. The suspension system as set forth in claim 1 wherein each of said first and second hanger assemblies comprises:

a housing positioned circumferentially around said bulbous cable region;

a rotatable collar connected to the housing, said collar restrained from axial movement relative to said housing, wherein said attachment member is pivotally connected to said collar.

3. The suspension system as set forth in claim 2 wherein said collar of each hanger assembly includes first and second trunnions, and wherein said attachment member of each housing assembly includes a yoke portion connected to said collar trunnions.

4. The suspension system as set forth in claim 3 wherein said attachment member includes a double clevis article attachment point.

5. The suspension system as set forth in claim 2 wherein, said first inner and outer insert elements each include an aperture formed therethrough, said apertures aligned and adapted for receipt of an associated alignment pin when said first inner and outer insert elements are operatively positioned to form said first bulbous cable region, and wherein said second inner and outer insert elements each include an aperture formed therethrough, said apertures aligned and adapted for receipt of an associated alignment pin when said second inner and outer insert elements are operatively positioned to form said second bulbous cable region.

6. The suspension system as set forth in claim 2 wherein said first and second axially spaced-apart hanger assemblies each include a pair of polyurethane sleeves positioned at opposite axial ends of said housing and radially between said housing and said outer set of elongated helically preformed rods to prevent damage to said outer set of helically preformed rods by said housing.

7. The suspension system as set forth in claim 1 wherein said cable is a lead-in cable of an oceanographic surveying towed cable array.

8. A method of connecting an article to a mid-span region of a cable at both first and second axially spaced-apart cable attachment points simultaneously, said method comprising:

(a) positioning first and second inner bulbous inserts circumferentially around a cable in an axially spaced relationship relative to each other;

(b) using a single inner set of helically preformed rods to encircle both said first and second axially spaced-apart inner inserts;

(c) positioning first and second outer bulbous inserts circumferentially around said inner set of helically preformed rod elements in the axial region of said first and second inner inserts so that said first and second outer inserts overlap said first and second axially spaced-apart inner inserts, respectively;

(d) using a single outer set of helically preformed rods to encircle both said first and second axially spaced-apart outer inserts so that said first inner and outer inserts and said second inner and outer inserts form first and second axially spaced-apart bulbous mid-span cable regions, respectively;

(e) attaching first and second hanger assemblies to said first and second bulbous cable regions, respectively; and, (f) connecting said article to both of said first and second hanger assemblies.

9. The method as set forth in claim 8 further comprising, before step (a), removing any fairing hair from a cable in at least first and second axially spaced hanger attachment points, and wherein said first and second inner inserts are positioned around said cable at said first and second hanger attachment points, respectively.

* * * * *